(12) United States Patent
Itoh et al.

(10) Patent No.: US 10,986,649 B2
(45) Date of Patent: Apr. 20, 2021

(54) COMMUNICATION APPARATUS, COMMUNICATION SYSTEM, COMMUNICATION METHOD, AND NON-TRANSITORY COMPUTER READABLE MEDIUM

(71) Applicant: NEC CORPORATION, Tokyo (JP)

(72) Inventors: Nobuhiko Itoh, Tokyo (JP); Takanori Iwai, Tokyo (JP); Ling Xu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/345,968

(22) PCT Filed: Oct. 31, 2016

(86) PCT No.: PCT/JP2016/004775
§ 371 (c)(1),
(2) Date: Apr. 29, 2019

(87) PCT Pub. No.: WO2018/078677
PCT Pub. Date: May 3, 2018

(65) Prior Publication Data
US 2020/0059942 A1 Feb. 20, 2020

(51) Int. Cl.
*H04W 72/12* (2009.01)
*H04W 72/08* (2009.01)

(52) U.S. Cl.
CPC ....... *H04W 72/1221* (2013.01); *H04W 72/08* (2013.01); *H04W 72/1252* (2013.01)

(58) Field of Classification Search
CPC ......... H04W 72/1221; H04W 72/1252; H04W 72/08; H04W 92/24; H04W 92/12; H04W 72/12; H04W 28/12
See application file for complete search history.

(56) References Cited

U.S. PATENT DOCUMENTS

| | | |
|---|---|---|
| 2010/0190487 A1 | 7/2010 | Wang et al. |
| 2014/0098778 A1 | 4/2014 | Valentin et al. |
| 2017/0156142 A1* | 6/2017 | Sato .................... H04L 27/2601 |

FOREIGN PATENT DOCUMENTS

| | | |
|---|---|---|
| JP | 2006-217335 A | 8/2006 |
| JP | 2010-239431 A | 10/2010 |

(Continued)

OTHER PUBLICATIONS

International Search Report for PCT/JP2016/004775 dated Dec. 13, 2016 English translation.

(Continued)

*Primary Examiner* — Jae Y Lee
(74) *Attorney, Agent, or Firm* — Sughrue Mion, PLLC

(57) ABSTRACT

An object is to provide a communication apparatus which can perform efficient scheduling for finishing data transmission of a plurality of UEs within a permitted delay time. A communication apparatus (10) according to the present invention includes: a selecting unit (11) configured to select a wireless terminal (30) which is an allocation target of radio resources according to a time to a transmission deadline of a flow related to each of the wireless terminals (30); an allocating unit (12) configured to determine radio resources allocated to the selected wireless terminal (30) so as to maximize use efficiency of the radio resources included in a control cycle including a plurality of unit times; and a communication unit (13) configured to transmit information related to the determined radio resource to a base station (20) configured to perform wireless communication with the selected wireless terminal (30).

8 Claims, 16 Drawing Sheets

(56) References Cited

FOREIGN PATENT DOCUMENTS

| | | | |
|---|---|---|---|
| JP | 2011-193529 A | 9/2011 | |
| JP | 2014-522145 A | 8/2014 | |
| JP | 2016/002166 | * 1/2016 | ............ H04W 88/08 |
| WO | 2008/133185 A1 | 11/2008 | |
| WO | 2008/149534 A1 | 12/2008 | |
| WO | 2016/002166 A1 | 1/2016 | |
| WO | 2016/093166 A1 | 6/2016 | |
| WO | 2016/134772 A1 | 9/2016 | |

OTHER PUBLICATIONS

Office Action dated Apr. 28, 2020 in Japanese Application No. 2018-546938 Machine Translation.

* cited by examiner

| Parameter | Description | Examples |
|---|---|---|
| UE identifier | IDENTIFIER INDICATING CONTROL TARGET UE | eNB/MME UE S1AP ID UE IP address or C-RNTI |
| Weight | IDENTIFIER INDICATING Weight OF RADIO RESOURCES OF eNB | Integer/Class Indicator |
| Delay budget | VALUE INDICATING PERMITTED DELAY TIME OF FLOW | Integer/Class Indicator |
| Direction | IDENTIFIER INDICATING UPLINK AND DOWNLINK OF CONTROL TARGET RADIO SECTION | Class Indicator (UP link, Downlink, Both) |

Fig. 10

| Parameter | Description | Examples |
|---|---|---|
| UE identifier | IDENTIFIER INDICATING CONTROL TARGET UE | eNB/MME UE S1AP Id<br>UE IP address or C-RNTI |
| Optional | | |

Fig. 11

| Parameter | Description | Examples |
|---|---|---|
| eNB ID | The ID of eNB to which this message is sent | GlobaleNB ID |
| MEC server ID | The ID of MEC from which this message is sent | Global MEC ID |
| Direction | IDENTIFIER INDICATING UPLINK AND DOWNLINK OF CONTROL TARGET RADIO SECTION | Class Indicator (UP link, Downlink, Both) |
| Notification Interval | | |

Fig. 13

| Parameter | Description | Examples |
| --- | --- | --- |
| MEC server ID | The ID of MEC to which this message is sent | GlobalMEC ID |
| eNB ID | The ID of eNB from which this message is sent | Global eNB ID |
| Direction | Is this CQI information for UL or DL | Class Indicator (UP link, Downlink, Both) |
| NUMBER OF TIMES OF DISCARD | NUMBER OF TIMES OF DISCARDING | Integer |
| AMOUNT OF DISCARDED DATA | TOTAL AMOUNT OF DISCARDED DATA | Integer |
| CQI VALUE | CQI VALUE OF EACH UE | Integer |
| BUFFER SIZE | | Integer |

Fig. 14

COMMUNICATION APPARATUS, COMMUNICATION SYSTEM, COMMUNICATION METHOD, AND NON-TRANSITORY COMPUTER READABLE MEDIUM

CROSS REFERENCE TO RELATED APPLICATIONS

This application is a National Stage of International Application No. PCT/JP2016/004775 filed Oct. 31, 2016.

TECHNICAL FIELD

The present invention relates to a communication apparatus, a communication system, a communication method and a program. More particularly, the present invention relates to a communication apparatus, a communication system, a communication method and a program which schedule radio resources.

BACKGROUND ART

Now, it is considered to provide ultra low latency service via a mobile network. The ultra low latency service may be autonomous driving service for transmitting in-vehicle sensor information, traffic camera information and map information via, for example, a mobile network.

A mobile carrier (mobile communication carrier) needs to guarantee SLA (Service Level Arrangement) to provide the ultra low latency service to users. SLA may define, for example, a delay time guaranteed by the ultra low latency service.

For example, Patent Literature 1 discloses efficiently allocating radio resources to a UE (User Equipment) to keep good service quality. More specifically, Patent Literature 1 discloses optimizing radio resource allocation by taking into account information related to an application delay restriction. In other words, Patent Literature 1 discloses that a base station keeps good service quality by optimizing radio resource allocation without exceeding a delay time permitted when application service is provided.

CITATION LIST

Patent Literature

PTL 1: Published Japanese Translation of PCT International Publication for Patent Application, No. 2014-522145

SUMMARY OF INVENTION

Technical Problem

Scheduling of radio resources disclosed in Patent Literature 1 is executed per TTI (Transmission Time Interval) which is a minimum unit time of scheduling. However, when guaranteeing SLA is taken into account, it is requested to perform efficient scheduling for finishing data transmission of one or a plurality of UEs within a permitted delay time.

An object of the present invention is to provide a communication apparatus, a communication system, a communication method and a program which can perform efficient scheduling for finishing data transmission of one or a plurality of UEs within a permitted delay time.

Solution to Problem

A communication apparatus according to a first aspect of the present invention includes: a selecting unit configured to select a wireless terminal that is an allocation target of a radio resource according to a time to a transmission deadline of a flow related to each of the wireless terminals; an allocating unit configured to determine a radio resource allocated to the selected wireless terminal so as to maximize use efficiency of the radio resource included in a control cycle including a plurality of unit times; and a communication unit configured to transmit information related to the determined radio resource to a base station configured to perform wireless communication with the selected wireless terminal.

A communication system according to a second aspect of the present invention includes: a communication apparatus configured to transmit, to a base station, information related to a transmission deadline of a flow related to each of wireless terminals; and a base station configured to select a wireless terminal that is an allocation target of a radio resource according to a time to the transmission deadline, and determine the radio resource allocated to the selected wireless terminal so as to maximize use efficiency of the radio resource included in a control cycle including a plurality of unit times.

A communication method according to a third aspect of the present invention includes: selecting a wireless terminal that is an allocation target of a radio resource according to a time to a transmission deadline of a flow related to each of wireless terminals; determining the radio resource allocated to the selected wireless terminal so as to maximize use efficiency of the radio resource included in a control cycle including a plurality of unit times; and transmitting information related to the determined radio resource to a base station configured to perform wireless communication with the selected wireless terminal.

A program according to a fourth aspect of the present invention causes a computer to execute: selecting a wireless terminal that is an allocation target of a radio resource according to a time to a transmission deadline of a flow related to each of wireless terminals; determining the radio resource allocated to the selected wireless terminal so as to maximize use efficiency of the radio resource included in a control cycle including a plurality of unit times; and transmitting information related to the determined radio resource to a base station configured to perform wireless communication with the selected wireless terminal.

Advantageous Effects of Invention

The present invention can provide a communication apparatus, a communication system, a communication method and a program which can perform efficient scheduling for finishing data transmission of a plurality of UEs within a permitted delay time.

BRIEF DESCRIPTION OF DRAWINGS

FIG. 10 is a view for explaining parameters set to a UEWeightUpdateRequest message according to the third embodiment.

FIG. 11 is a view for explaining parameters set to the UEWeightUpdateResponse message according to the third embodiment.

FIG. 13 is a view for explaining parameters set to a DeadlineSuccessNotificationSetup message according to the third embodiment.

FIG. 14 is a view for explaining parameters set to the DeadlineSuccessNotification message according to the third embodiment.

DESCRIPTION OF EMBODIMENTS

First Embodiment

Figure 1:
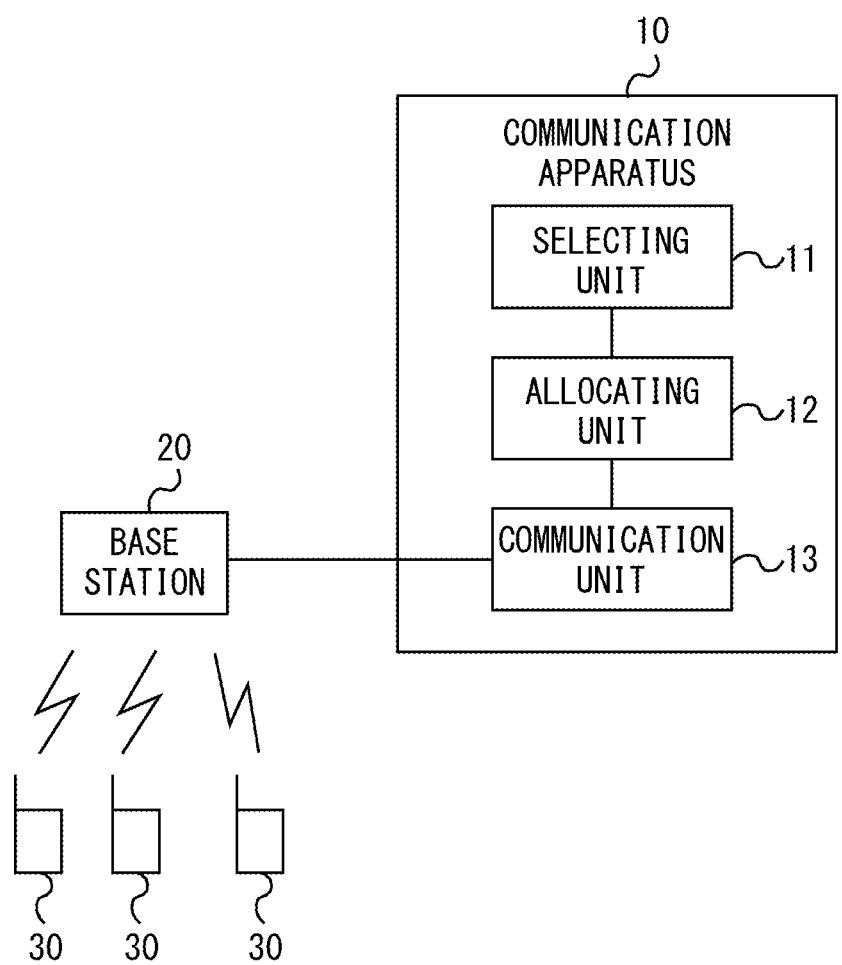
FIG. 1 is a configuration diagram of a communication system according to a first embodiment.

Embodiments of the present invention will be described below with reference to the drawings. A configuration example of a communication system according to the first embodiment of the present invention will be described with reference to FIG. 1. A communication system in FIG. 1 includes a communication apparatus 10, a base station 20 and a plurality of wireless terminals 30. The communication apparatus 10, the base station 20 and the wireless terminals 30 are computer apparatuses which operate when processors execute programs stored in memories.

The wireless terminals 30 may be mobile telephone terminals, smartphone terminals or tablet terminals. Alternatively, the wireless terminals 30 may be IoT terminals used for IoT (Internet of Things) service, M2M (Machine to Machine) terminals or MTC (Machine Type Communication) terminals. The wireless terminals 30 perform wireless communication with the base station 20.

The base station 20 may be an eNB (evolved Node B) or a Node B which are defined by 3GPP (3rd Generation Partnership Project). The eNB is a base station which uses LTE (Long Term Evolution) as a wireless communication scheme. The Node B is a base station which uses a wireless communication scheme which is referred to as 3G by 3GPP as the wireless communication scheme. Furthermore, the base station 20 is not limited to the wireless communication scheme defined by 3GPP, and may use wireless communication schemes which are defined by other standards organizations. The base station 20 may be referred to as a radio access network node.

The communication apparatus 10 is an apparatus which controls the base station 20. For example, the communication apparatus 10 may perform control related to scheduling executed by the base station 20. The scheduling executed by the base station 20 may be referred to as MAC (Medium Access Control) scheduling or packet scheduling.

The communication apparatus 10 may be, for example, an SCEF (Service Capability Exposure Function) entity (referred to as an SCEF below) defined by 3GPP. The SCEF executes authentication processing related to an application server managed by the mobile communication carrier or an application service provider. Furthermore, the SCEF communicates with the base station 20 which is the eNB via a reference point defined by 3GPP. The SCEF entity transmits control data in a core network, for example. The control data is used to, for example, set a communication route for transmitting user data related to the wireless terminals 30. The SCEF entity may be referred to as, for example, a CPF (C-Plane Function) entity which is a node apparatus which transmits control data.

Furthermore, the communication apparatus 10 is an MEC (Mobile Edge Computing) server. The MEC server may be disposed at a position at which direct communication with the base station 20 can be performed. The position at which direction communication can be performed is a position at which communication can be performed without the core network managed by the mobile communication carrier. For example, the MEC server may be physically integrated with the base station 20. Alternatively, the MEC server may be disposed in the same building as that of the base station 20 and connected to an LAN (Local Area Network) in the building so as to be able to communicate with the base station 20. When the MEC server is disposed near the base station 20, the MEC server can reduce transmission delay between the MEC server and the wireless terminal 30. The MEC server is used to provide, for example, application service of ultra low latency.

Furthermore, the communication apparatus 10 may be disposed in an IoT platform including a server group which provides IoT service to the wireless terminals 30. Alternatively, the communication apparatus 10 may be a server apparatus which can communicate with the base station 20 directly or via a network. The communication apparatus 10 may have a function of one of a Control Plane and a User Plane when the communication apparatus 10 is the above-exemplified apparatus or other apparatuses.

Next, a configuration example of the communication apparatus 10 will be described. The communication apparatus 10 includes a selecting unit 11, an allocating unit 12 and a communication unit 13. The selecting unit 11, the allocating unit 12 and the communication unit 13 may be software or modules whose processing is executed when the processor executes programs stored in the memory. Furthermore, the selecting unit 11, the allocating unit 12 and the communication unit 13 may be hardware such as chips or circuits.

The selecting unit 11 selects the wireless terminal 30 which is a radio resource allocation target according to a time to a transmission deadline of a flow related to each of the wireless terminals 30. The flow related to each wireless terminal 30 includes, for example, one or a plurality of items of data transmitted by the application service provided to the wireless terminal 30. Furthermore, data included in the flow may be referred to as a data packet. The flow related to the wireless terminal 30 may be a flow transmitted from the wireless terminal 30 to the base station 20 or a flow transmitted from the base station 20 to the wireless terminal 30. Alternatively, the flow related to the wireless terminal 30 may include a flow transmitted from the wireless terminal 30 to the base station 20 or a flow transmitted from the base station 20 to the wireless terminal 30. Data included in the flow transmitted from the wireless terminal 30 to the base station 20 will be referred to as UL (Uplink) data. Furthermore, data included in the flow transmitted from the base station 20 to the wireless terminal 30 will be referred to as DL (Downlink) data. Data (e.g., application data) transmitted by the application service may be, for example, image data or moving image data. Furthermore, the application data may include a request message for requesting transmission of image data or a response message for responding to the request message.

The transmission deadline means a time limit by which transmission of a plurality of data packets included in one flow needs to be finished. The transmission deadline is requested by an application. The transmission deadline can be also referred to as a transmission time limit. Alternatively, the transmission deadline can be also referred to as maximum transmission delay which is permitted by an application. The transmission deadline can be variously defined. For example, the transmission deadline may indicate a transmission completion time limit of a sender of an application layer. Alternatively, the transmission deadline may indicate a transmission completion time limit of a sender of a radio layer. Alternatively, the transmission deadline may indicate a reception completion time limit of a receiver of an application layer. Alternatively, the transmission deadline may indicate a reception completion time limit of a receiver of a radio layer. Alternatively and more specifically, the transmission deadline may indicate a time limit by which a receiver of an application layer finishes receiving a last data packet related to one flow after a sender of the application layer starts transmitting a first data packet related to the one flow. Alternatively, the transmission deadline may indicate a time limit by which a receiver of a radio layer finishes receiving a last data packet related to one flow after a sender of the radio layer starts transmitting a first data packet related to the one flow.

Information related to the transmission deadline may be received by the MEC server from the application server. For data which reaches a user plane of the MEC server, the MEC server may decide service which is applied to this data, and decide the transmission deadline based on this service. Furthermore, the MEC server may receive, from the application server, information of the service which is applied to the data, and decide the transmission deadline based on this service. In addition, the MEC server may receive information of a buffer of the eNB from the eNB, and preferentially allocate a resource block to a flow accumulated in the buffer.

The selecting unit 11 may select as a radio resource allocation target, for example, the wireless terminal 30 which transmits or receives data related to a flow of the shortest time to the transmission deadline. Alternatively, the selecting unit 11 may select as the radio resource allocation target the wireless terminal 30 which transmits or receives data related to a flow whose time to the transmission deadline is shorter than a predetermined threshold.

The allocating unit 12 determines radio resources allocated to the selected wireless terminal so as to maximize use efficiency of radio resources included in a control cycle including a plurality of unit times. The unit time may be, for example, one TTI (Transmission Time Interval) which is a scheduling cycle of MAC scheduling in the base station 20. The one TTI is defined as one millisecond by MAC scheduling executed by LTE. The control cycle is, for example, a period including two or more TTIs.

The use efficiency of the radio resources may be, for example, the number of bits of a data packet which is actually transmitted with respect to the number of bits of a data packet which can be transmitted by using the radio resources. The higher use efficiency indicates that the radio resources are more effectively used.

The communication unit 13 transmits information related to the radio resources determined by the allocating unit 12 to the base station 20 which performs wireless communication with the wireless terminal 30 selected by the selecting unit 11. The base station 20 allocates the radio resources to the wireless terminal 30 selected by the selecting unit 11 according to the information related to the radio resources transmitted from the communication apparatus 10. In other words, the base station 20 performs scheduling related to the wireless terminal 30 selected by the selecting unit 11 according to the information related to the radio resources transmitted from the communication apparatus 10.

As described above, the communication apparatus 10 in FIG. 1 can determine the wireless terminal 30 to which radio resources are allocated by taking into account a time to the transmission deadline. By, for example, selecting the wireless terminal 30 which transmits or receives data related to a flow whose time to the transmission deadline is short, the communication apparatus 10 can preferentially allocate radio resources to the wireless terminal to which radio resources need to be allocated quickly.

Furthermore, the communication apparatus 10 can allocate the radio resources to the wireless terminal 30 so as to maximize use efficiency of the radio resources in a control cycle including a plurality of unit times. Consequently, it is possible to perform efficient scheduling for finishing data transmission of the wireless terminal 30 by taking into account the time to the transmission deadline.

Second Embodiment

Figure 2:
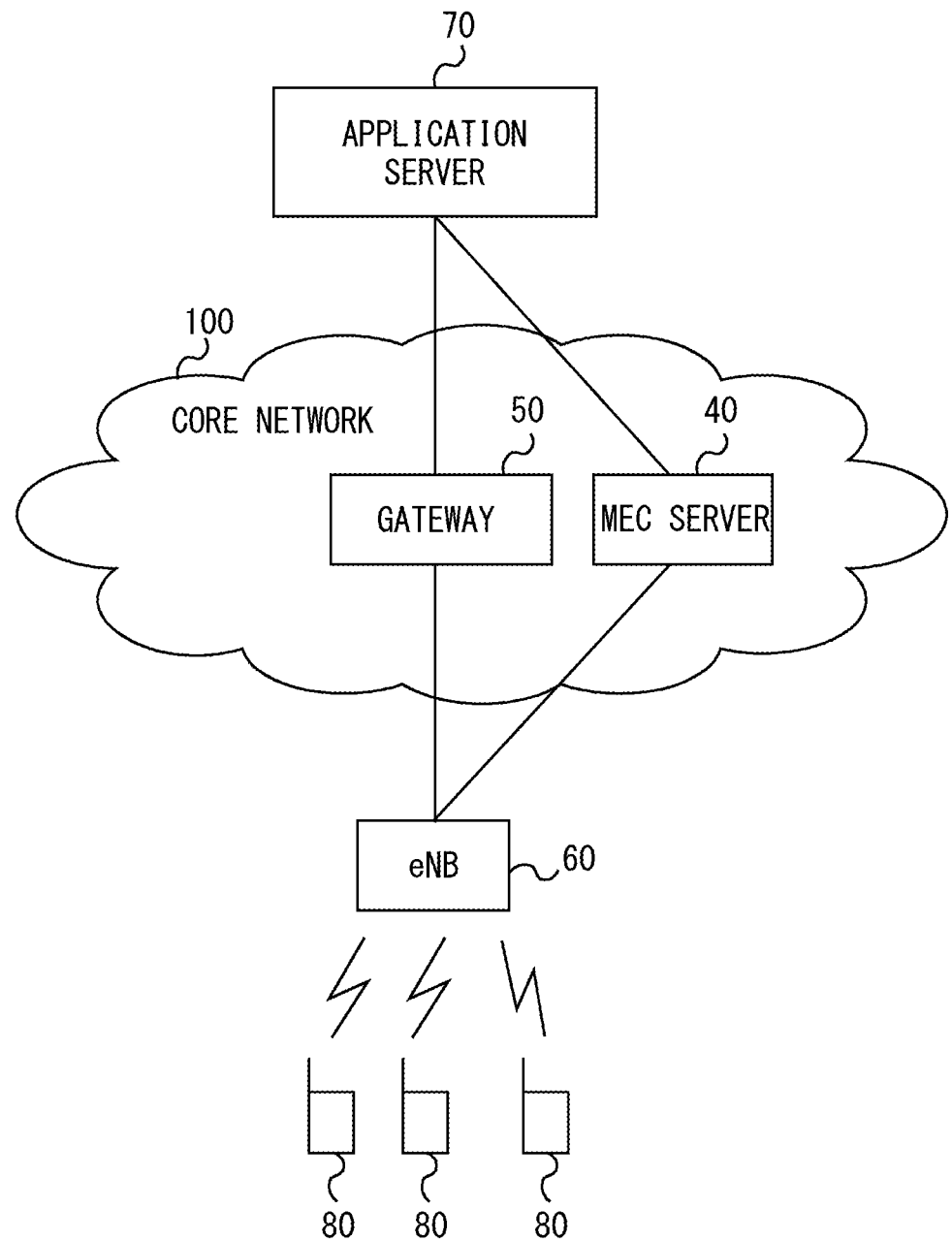
FIG. 2 is a configuration diagram of a communication system according to a second embodiment.

Next, a configuration example of a communication system according to a second embodiment of the present invention will be described with reference to FIG. 2. The communication system in FIG. 2 is a communication system defined by 3GPP. The communication system in FIG. 2 includes an eNB 60, an application server 70, a core network 100 and a plurality of UEs 80. The UE 80 is a general term of communication terminals used by 3GPP. The core network 100 is a network which is managed by a mobile communication carrier. The core network 100 includes an MEC server 40 and a gateway 50.

The gateway 50 may be an SGW (Serving Gateway) or a PGW (Packet Data Network Gateway) which transmits user data related to the UE 80 in, for example, the core network 100. Alternatively, the gateway 50 may be a UPF (U-Plane Function) entity which is a node apparatus which transmits the user data related to the UE 80. The user data may be, for example, image data or moving image data.

The MEC server 40 is disposed near the eNB 60, and provides application service to the UE 80 via the eNB 60. Furthermore, the MEC server 40 provides the application service to the UE 80 in cooperation with the application server 70.

The application server 70 is a server which provides the application service to the UE 80. The application server 70 transmits, for example, the user data to the gateway 50.

Furthermore, the application server 70 transmits a data size of the user data transmitted during one flow, and information related to a transmission deadline of the one flow to the MEC server 40.

The gateway 50 transmits the user data transmitted from the application server 70 to the eNB 60. Furthermore, the gateway 50 transmits the user data transmitted from the eNB 60 to the application server 70.

The MEC server 40 schedules the radio resources by using the information transmitted from the application server 70. The MEC server 40 transmits a radio resource scheduling result to the eNB 60.

The eNB 60 actually allocates the radio resources to the UE 80 by using the radio resource scheduling result transmitted from the MEC server 40.

Figure 3:
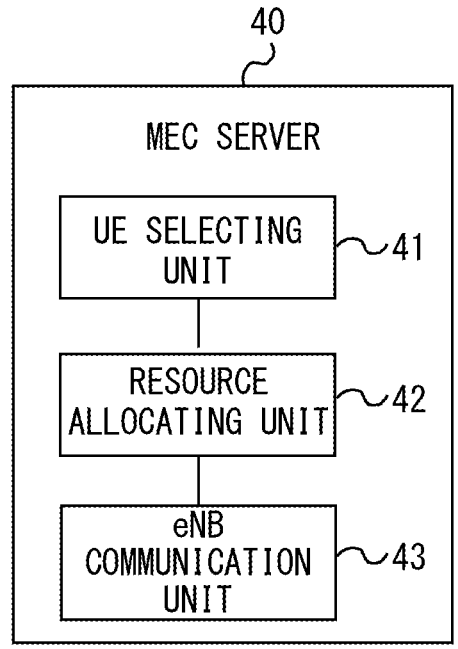
FIG. 3 is a configuration diagram of an MEC server according to the second embodiment.

Next, a configuration example of the MEC server 40 according to the second embodiment will be described with reference to FIG. 3. The MEC server 40 includes a UE selecting unit 41, a resource allocating unit 42 and an eNB communication unit 43. The UE selecting unit 41, the resource allocating unit 42 and the eNB communication unit 43 may be software or modules whose processing is executed when a processor executes programs stored in a memory. Furthermore, the UE selecting unit 41, the resource allocating unit 42 and the eNB communication unit 43 may be hardware such as chips or circuits.

The UE selecting unit 41 selects as a radio resource allocation target, for example, the UE 80 which transmits or receives a data packet related to a flow whose time to a transmission deadline is the shortest. More specifically, the UE selecting unit 41 extracts a flow of the minimum difference between the transmission deadline related to each flow transmitted from the application server 70, and a current time. The UE selecting unit 41 selects the UE 80 which transmits or receives the data packet related to the extracted flow as a UE to which radio resources are allocated.

Alternatively, the UE selecting unit 41 may extract a flow whose difference between the transmission deadline and the current time is smaller than a predetermined threshold. In this case, the UE selecting unit 41 may extract a plurality of flows. The UE selecting unit 41 may select one or a plurality of UEs 80 which transmit or receive a data packet related to the extracted flow as a UE to which the radio resources are allocated.

The resource allocating unit 42 receives communication quality of the radio resources measured by the eNB 60 or communication quality of the radio resources measured by the UE 80 from the eNB 60 via the eNB communication unit 43. The communication quality may be, for example, a CQI (Channel Quality Indicator) or may be information indicating other quality.

The resource allocating unit 42 may determine the radio resources which are allocated to the UE 80 selected by the UE selecting unit 41 according to the communication quality of the radio resources and a data amount of the data packet which needs to be transmitted within a control cycle.

Furthermore, a CQI value received by the resource allocating unit 42 indicates communication quality of radio resources prior to the current time when transmission delay between the eNB 60 and the MEC server 40 is taken into account. Hence, the resource allocating unit 42 may take into account the transmission delay between the MEC server 40 and the eNB 60, and estimate a CQI value at a current time from the CQI value received from the eNB 60. For example, the resource allocating unit 42 may estimate the CQI value at the current time according to a tendency of a fluctuation of previously obtained CQI values. The MEC server 40 may transmit a control signal to the eNB 60 on a regular basis, receive a response signal transmitted from the eNB 60 and thereby calculate the transmission delay between the MEC server 40 and the eNB 60. Alternatively, the transmission delay between the MEC server 40 and the eNB 60 may be determined in advance as system information.

The resource allocating unit 42 outputs the information related to the radio resources allocated to the UE 80 to the eNB communication unit 43. The information related to the radio resources may be, for example, identification information for identifying the radio resources. Furthermore, the resource allocating unit 42 may take into account the transmission delay between the eNB 60 and the MEC server 40, and output to the eNB communication unit 43 the information related to the radio resources which take into account the CQI value at a timing at which the eNB 60 receives the information related to the radio resources. Radio resource determination processing of the resource allocating unit 42 will be described later in detail.

The eNB communication unit 43 outputs information related to communication quality of the radio resources transmitted from the eNB 60 to the resource allocating unit 42. Furthermore, the eNB communication unit 43 transmits to the eNB 60 the information related to the radio resources determined by the resource allocating unit 42 and allocated to the UE 80.

In this regard, the MEC server 40 may calculate the transmission deadline per TTI or per flow. The MEC server 40 may calculate the transmission deadline in each of uplink and downlink. The MEC server 40 may notify the base station of the calculated transmission deadline per TTI. The transmission deadline can calculate the transmission deadline in each of the downlink and the uplink according to $$ulDeadline = ulAverageThroughput/(ulAverageThroughput+dlAverageThroughput) \times (deadline\ of\ end\ to\ end\ of\ (UE)).$$
$$dlDeadline = dlAverageThroughput/(ulAverageThroughput+dlAverageThroughput) \times (deadline\ of\ end\ to\ end\ of\ UE).$$

ulDeadline is a transmission deadline in the uplink, and dlDeadline is a transmission deadline in the downlink. ulAverageThroughput is an average throughput in the uplink, and dlAverageThroughput is an average throughput in the downlink. In addition, as the average throughput in each of the uplink and the downlink used to calculate the transmission deadline, a throughput obtained by dividing a data amount transmitted in a certain period by this certain period may be used, or a value obtained by calculating an exponential moving average based on the throughput and an achievable throughput described later may be used.

Figure 4:
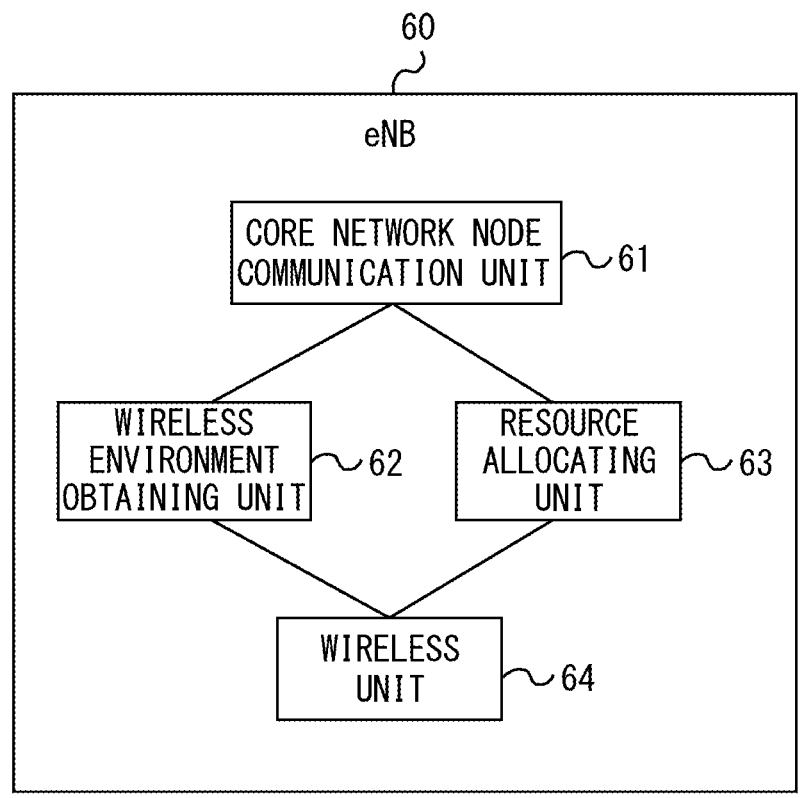
FIG. 4 is a configuration diagram of an eNB according to the second embodiment.

Next, a configuration example of the eNB 60 according to the second embodiment will be described with reference to FIG. 4. The eNB 60 includes a core network node communication unit 61, a wireless environment obtaining unit 62, a resource allocating unit 63 and a wireless unit 64. The core network node communication unit 61, the wireless environment obtaining unit 62, the resource allocating unit 63 and the wireless unit 64 are software or modules whose processing is executed when a processor execute programs stored in a memory. Furthermore, the core network node communication unit 61, the wireless environment obtaining unit 62, the resource allocating unit 63 and the wireless unit 64 may be hardware such as chips or circuits.

The wireless environment obtaining unit 62 measures communication quality of radio resources for transmitting UL data by using UL data received from the UE 80 via the wireless unit 64. Furthermore, the wireless environment obtaining unit 62 receives from the UE 80 the communication quality of the radio resources measured by the UE 80 by using DL data and used to transmit the DL data. The wireless environment obtaining unit 62 receives the information related to the communication quality of the radio resources for transmitting the DL data from the UE 80 via the wireless unit 64.

The wireless environment obtaining unit 62 transmits the communication quality of the radio resources for transmitting the UL and DL data to the MEC server 40 via the core network node communication unit 61.

The resource allocating unit 63 receives information related to allocation of the radio resources transmitted from the MEC server 40 via the core network node communication unit 61. The resource allocating unit 63 allocates the radio resources to the UE 80 by using the information related to the allocation of the received radio resources.

The wireless unit 64 transmits the DL data to the UE 80 by using the radio resources allocated by the resource allocating unit 63. Furthermore, the wireless unit 64 transmits to the UE 80 the information related to the radio resources used to transmit the UL data to the UE 80.

In this regard, the MEC server 40 may calculate an achievable throughput for each flow. The achievable throughput is a throughput in a case where a maximum number of resource blocks which can be allocated to the one UE 80 are allocated. This value is assumed to fluctuate per TTI.

When a requested throughput (=remaining flow size/remaining time to transmission deadline) exceeds the achievable throughput, the eNB 60 decides that it is difficult or impossible to meet the transmission deadline of the flow, and prioritize other flows by discarding or postponing this flow.

Furthermore, the eNB 60 may calculate a parameter (=achievable throughput×flow urgency) indicating a flow priority. The flow urgency is the same as the above requested throughput (=remaining flow size/remaining time to transmission deadline) as long as the flow urgency does not become 0. When the requested throughput exceeds the achievable throughput as described above, the eNB 60 makes the urgency 0 when calculating this parameter.

Figure 5:
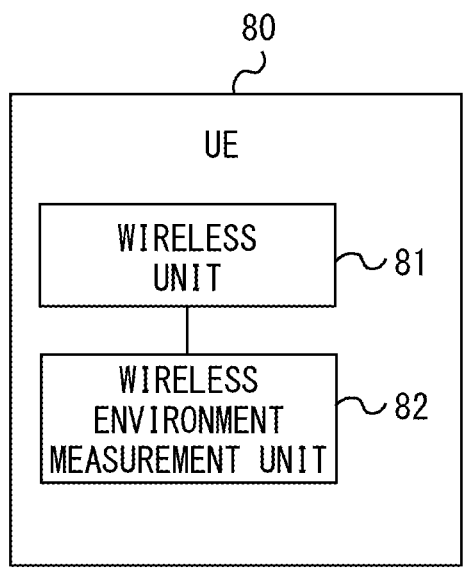
FIG. 5 is a configuration diagram of a UE according to the second embodiment.

Next, a configuration example of the UE 80 according to the second embodiment will be described with reference to FIG. 5. The UE 80 includes a wireless unit 81 and a wireless environment measurement unit 82. The wireless unit 81 and the wireless environment measurement unit 82 may be software or modules whose processing is executed when a processor executes programs stored in a memory. Furthermore, the wireless unit 81 and the wireless environment measurement unit 82 may be hardware such as chips or circuits.

The wireless environment measurement unit 82 measures the communication quality of the radio resources for transmitting DL data by using the DL data transmitted from the eNB 60. The wireless environment measurement unit 82 transmits to the eNB 60 the communication quality of the radio resources for transmitting the DL data via the wireless unit 81.

Next, a flow of radio resource determination processing of the resource allocating unit 42 according to the second embodiment will be described with reference to FIG. 6. First, the UE selecting unit 41 selects as a radio resource allocation target the UE 80 which transmits data related to a flow whose time to the transmission deadline is the shortest (S11).

Next, the resource allocating unit 42 calculates a data amount A (bit) which the UE 80 selected in step S11 needs to transmit within a control cycle T (TTI) (S12). For example, the resource allocating unit 42 calculates the data amount A which needs to be transmitted within the control cycle by using a remaining time a (TTI) to the transmission deadline of the flow related to the UE 80, and an untransmitted data amount b (bit). For example, the resource allocating unit 42 calculates the data amount A by using an equation of $A=(b/a)\times T$. In a case of a $<T$, A is calculated assuming $T=a$.

Next, the resource allocating unit 42 decides whether nor a $\geq T$ is satisfied (S13). In a case of a $\geq T$, the resource allocating unit 42 extracts the best CQI value (CQI_max) among resource blocks (RB) within the control cycle (S13-1). In a case of a $<T$, the resource allocating unit 42 extracts the best CQI value (CQI_max) among the resource blocks (RB) within the remaining time a to the deadline (S13-2). Hereinafter, radio resources allocated to the UE will be described by using resource blocks. The resource blocks are specified by using time information and frequency information. A CQI value of each resource block is transmitted from the eNB 60 to the MEC server 40. The CQI value may be indicated by using an integer such as a level 1 or level 2. In this case, a larger value indicates better quality of the resource block. Furthermore, a level equal to or more than a level X (X is an integer) may be a High level, a level equal to or more than a level Y (Y is an integer smaller than X) may be a Middle level and a level lower than the level Y may be a Low level.

Figure 7:
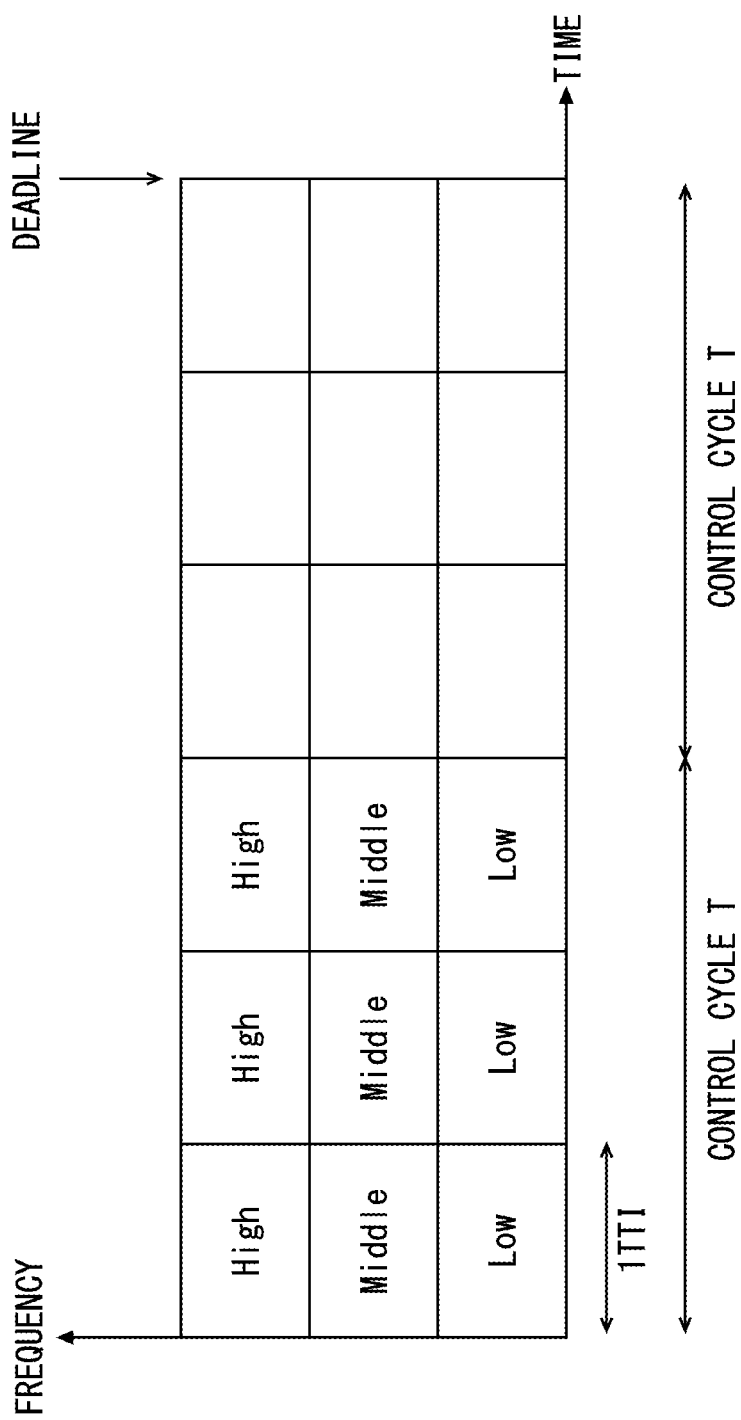
FIG. 7 is a view for explaining resource blocks according to the second embodiment.

Hereinafter, a resource block indicating the CQI value will be described with reference to FIG. 7. In FIG. 7, a vertical axis indicates a frequency, and a horizontal axis indicates a time. FIG. 7 illustrates that there are three resource blocks of different frequencies in one TTI. Furthermore, FIG. 7 illustrates that the control cycle T is three TTIs. High, Middle and Low indicated per resource block indicate CQI levels. Furthermore, FIG. 7 illustrates that a deadline timing is set to the last of the second control cycle T. CQI_max is a CQI value indicating the High level in the control cycle T.

The CQI value in the first TTI in FIG. 7 is the CQI value obtained from the eNB 60. The resource allocating unit 42 may estimate, for example, CQI values in subsequent TTIs from a tendency of a fluctuation of previously obtained CQI values. In other words, the CQI value in the first TTI in the control cycle T may be the CQI value obtained from the eNB 60.

Figure 6:
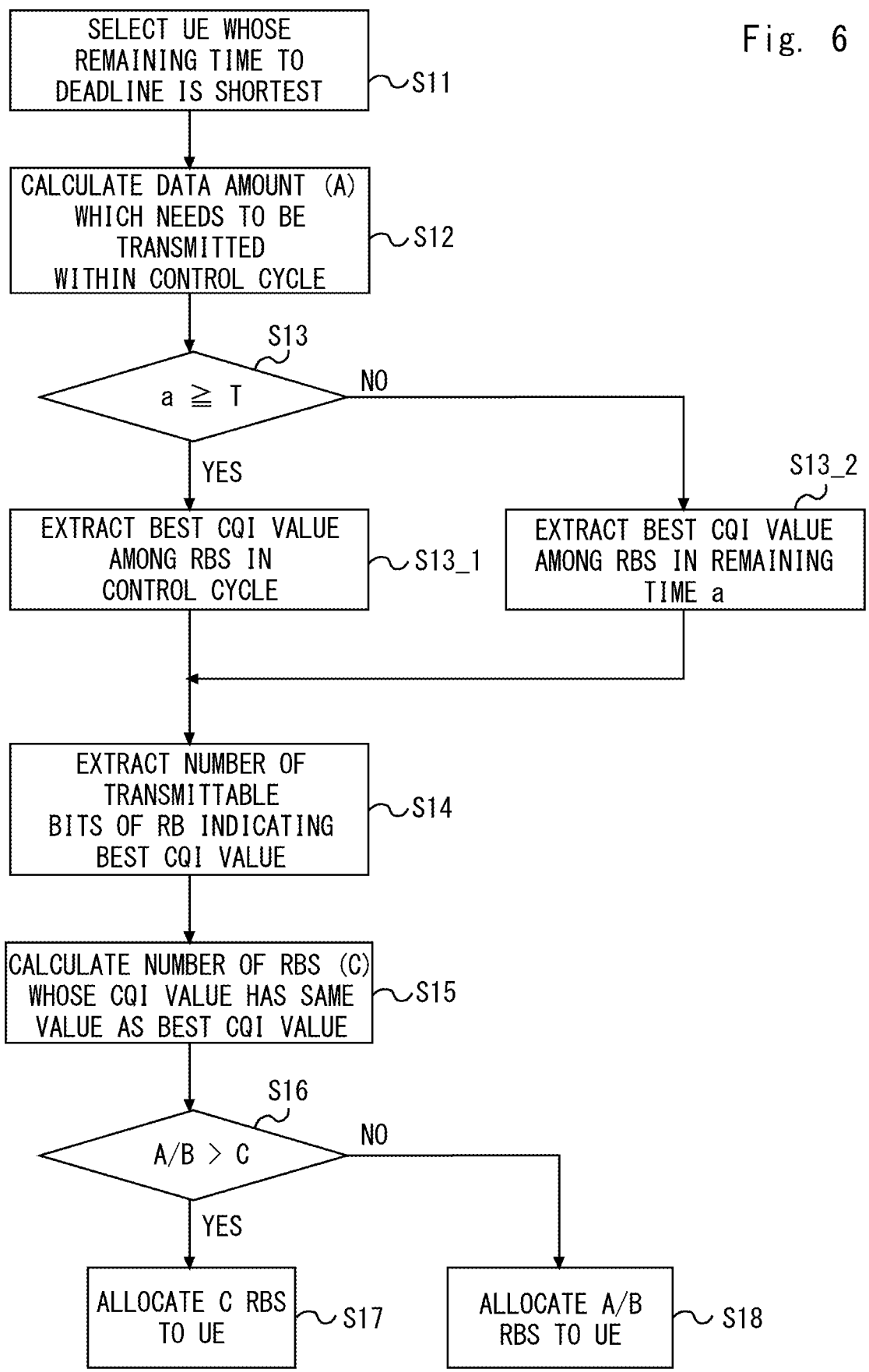
FIG. 6 is a view illustrating a flow of radio resource determination processing according to the second embodiment.

Back to FIG. 6, the resource allocating unit 42 extracts the number of transmittable bits B of a radio resource block which is CQI_max (S14). The number of transmittable bits of each radio resource is determined in advance according to the CQI value. The MEC server 40 may store the CQI value, and information associated with the number of transmittable bits of the CQI value in the memory. Alternatively, the MEC server 40 may obtain the CQI value and the information associated with the number of transmittable bits of the CQI value from another node apparatus.

Next, the resource allocating unit 42 calculates the number of resource blocks C whose CQI value is CQI_max in the control cycle T (S15). More specifically, the resource allocating unit 42 calculates the number of resource blocks indicating the High level as the CQI value. FIG. 7 illustrates that the number of resource blocks C whose CQI value is CQI_max is three.

Next, the resource allocating unit 42 decides whether or not A/B>C is satisfied (S16). A/B indicates the number of resource blocks which are necessary to transmit the data amount A which needs to be transmitted within the control cycle T. When deciding that A/B>C is satisfied, the resource allocating unit 42 allocates C resource blocks to the UE 80 selected by the UE selecting unit 41 in step S11 (S17).

When deciding that A/B>C is not satisfied, the resource allocating unit 42 allocates A/B resource blocks to the UE 80 selected by the UE selecting unit 41 in step S11 (S18).

In step S12 in FIG. 6, the data amount A which needs to be transmitted is calculated by taking into account the remaining time a to the transmission deadline, yet, in addition, may be calculated by taking into account at least one of communication delay between the MEC server 40 and the eNB 60 and a CQI fluctuation between the UE 80 and the eNB 60. Taking the communication delay into account is to, for example, remove communication delay between the MEC server 40 and the eNB 60 by using a communication disturbance observer as a control theory. More specifically, a difference between a predicted value of an untransmitted data amount in a case where there is no communication delay and an untransmitted data amount which is produced during actual communication is fed back as an influence of the communication delay to next radio resource determination processing. Furthermore, taking the CQI fluctuation into account may be to, for example, remove a CQI fluctuation between the UE 80 and the eNB 60 by using the communication disturbance as the control theory. More specifically, a difference between a predicted value of a data amount which can be transmitted based on a current CQI and a data amount which is actually transmitted is fed back as an influence of the CQI fluctuation to next radio resource determination processing. The transmitted data amount may be calculated by using the untransmitted data amount. The disturbance may be, for example, radio wave environment, a traffic amount fluctuation or the number of UEs which communicate with the eNB 60. Furthermore, a communication delay compensating function of removing communication delay is executed by the MEC server 40, and a CAI fluctuation compensating function of removing a CAI fluctuation may be executed by the eNB 60.

Hereinafter, an effect obtained by executing radio resource determining processing according to the second embodiment will be described. Scheduling of radio resources disclosed in Patent Literature 1 is executed per TTI. That is, each UE to which resource blocks are allocated is determined per TTI. In this case, the resource blocks are allocated to a UE whose CQI value is high and whose number of transmittable bits is large.

Figure 8:
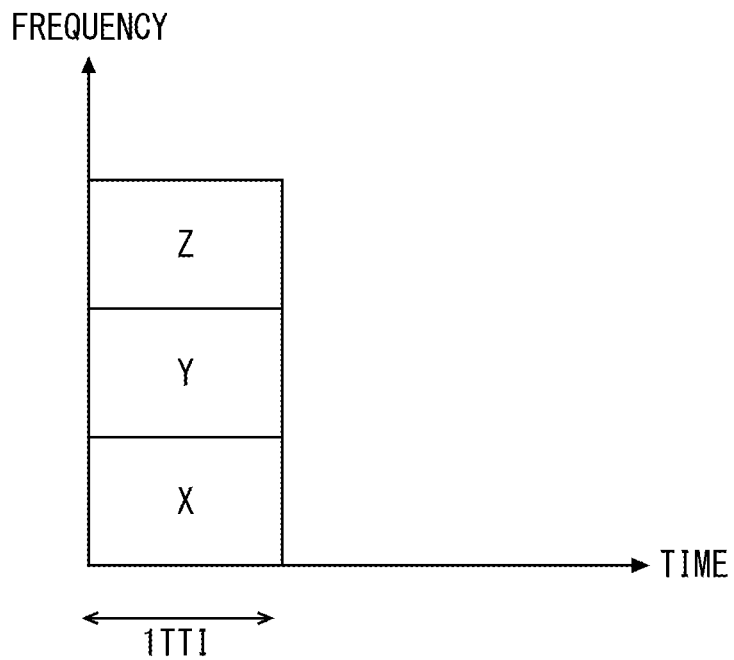
FIG. 8 is a view for explaining general resource blocks.

Scheduling of radio resources performed per TTI will be described with reference to, for example, FIG. 8. The CQI value of the resource block differs per UE. Hence, when, for example, a resource block X is allocated to a UE #A, four-bit data can be transmitted and, when the resource block X is allocated to a UE #B, three-bit data can be transmitted. Furthermore, when a resource block Y is allocated to the UE #A, two-bit data can be transmitted and, when the resource block Y is allocated to the UE #B, one-bit data can be transmitted.

In this case, the resource blocks X and Y are allocated to the UE #A. However, even when the resource blocks X and Y are allocated, the UE #A can transmit only two-bit data in each resource block. That is, even when a plurality of resource blocks are allocated to one UE in one TTI, the smallest number of bits among the numbers of transmittable bits is applied as the number of transmittable bits in each resource block. That is, when the resource blocks X and Y are allocated to the UE #A in one TTI, the UE #A can transmit two-bit data in each resource block. As a result, the UE #A can transmit four-bit data by using the resource blocks X and Y.

In addition, if the resource block X is allocated to the UE #B and the resource block Y is allocated to the UE #A, five-bit data in total can be transmitted by using the resource blocks X and Y.

Thus, according to a scheduling scheme of preferentially allocating resource blocks to a UE whose CQI value is high and whose number of transmittable bits is large per TTI, resource block use efficiency lowers.

On the other hand, by executing scheduling according to the second embodiment, it is possible to allocate a plurality of resource blocks having CQI values of the High level to the UE within the control cycle T including a plurality of TTIs. When, for example, resource blocks having CQI values of the High level are arranged in different TTIs, it is possible to avoid allocating the resource blocks having CQI values of different levels to a UE in the same TTI. As a result, scheduling of the radio resources according to the second embodiment can increase use efficiency compared to a case where scheduling of radio resources is performed per TTI. Furthermore, when a plurality of resource blocks having CQI values of the High level are arranged in the same TTI, a plurality of resource blocks having the CQI values of the High level may be allocated to the UE. In this case, a plurality of resource blocks having CQI values of the substantially same level are allocated to the UE, and therefore the radio resource use efficiency does not lower.

Furthermore, by preferentially allocating resource blocks having CQI values of the High level to a UE whose time to a transmission deadline is short, it is possible to increase a probability that transmission of the flow is finished by the transmission deadline.

Third Embodiment

Next, a flow of processing of controlling scheduling of radio resources according to the third embodiment will be described with reference to FIG. 9.

First, an MEC server 40 transmits to the eNB 60 information which is necessary for scheduling in the eNB 60 (S21). More specifically, the MEC server 40 transmits a UEWeightUpdateRequest message to the eNB 60. Parameters illustrated in FIG. 10 are set to the UEWeightUpdateRequest message.

For example, a UE identifier, a Weight, a Delay budget and a Direction are set to the UEWeightUpdateRequest message. The UE identifier is an identifier which indicates a control target UE. The control target UE may be, for example, a UE which can be a radio resource allocation target. The UE identifier may be, for example, an S1AP ID, an IP address or a C-RNTI (Cell-Radio Network Temporary Identifier).

The Weight may be an identifier which indicates the Weight indicating a priority of radio resources of an eNB. The Weight may be an integer value or a Class Indicator. The Delay budget may be a transmission deadline of a flow related to a UE identified based on the UE Identifier, or a value indicating a permitted delay time. The Delay budge may be an integer value or a Class Indicator.

The Direction is an identifier which indicates uplink or downlink of a control target radio section. For example, the Direction may indicate whether a flow target related to the Delay budge is UL, DL or UL and DL.

When receiving the UEWeightUpdateRequest message, the eNB 60 calculates a remaining time to the transmission deadline by using the Delay budge. Furthermore, the eNB 60 selects a UE 80 which transmits or receives data related to the flow whose remaining time to the transmission deadline is short as a radio resource allocation target. In this regard, when there are a plurality of UEs including flows whose Delay budgets are the same and whose remaining times to the transmission deadline are the same, a UE of a higher Weight may be selected as the radio resource allocation target.

Furthermore, the eNB 60 allocates resource blocks to the selected UE similar to a resource allocating unit 42 described in the second embodiment.

Figure 9:
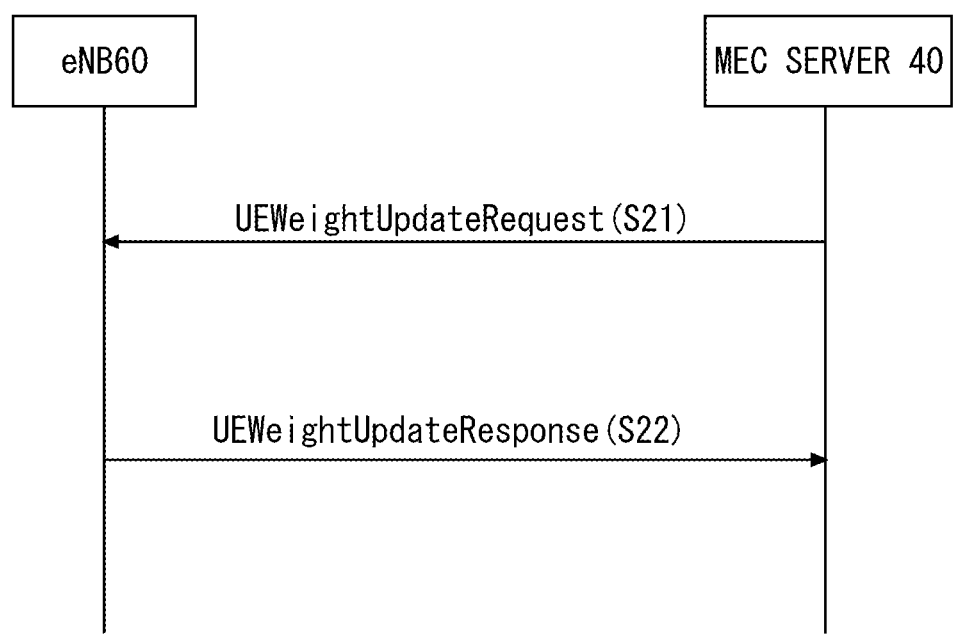
FIG. 9 is a view illustrating a flow of processing of controlling scheduling of radio resources according to a third embodiment.

Back to FIG. 9, when receiving the UEWeightUpdateRequest message, the eNB 60 transmits a response message to the MEC server 40. More specifically, the eNB 60 transmits the UEWeightUpdateRequest to the MEC server 40 (S22). A UE identifier indicating a control target UE is set to the UEWeightUpdateRequest message as illustrated in FIG. 11.

The eNB 60 may select a UE which is a radio resource allocation target, and transmit the UEWeightUpdateRequest message to the MEC server 40 after allocating the resource blocks to the UE or transmit the UEWeightUpdateRequest to the MEC server 40 before selecting the UE which is the radio resource allocation target.

Figure 12:
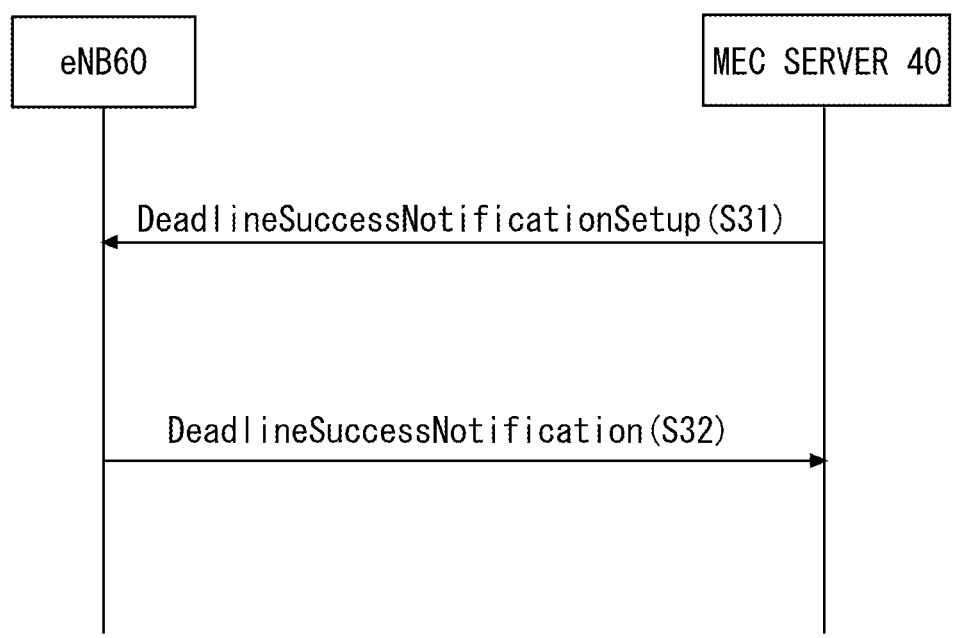
FIG. 12 is a view illustrating a flow of transmission processing of information related to a transmission deadline achievement status according to the third embodiment.

Next, a flow of transmission processing of information related to a transmission deadline achievement status will be described with reference to FIG. 12. First, the MEC server 40 transmits a request message to the eNB 60 to obtain the transmission deadline achievement status from the eNB 60 (S31). More specifically, the MEC server 40 transmits a DeadlineSuccessNotificationSetup message to the eNB 60. Parameters illustrated in FIG. 13 are set to the DeadlineSuccessNotificationSetup message.

For example, an eNB ID indicating the transmission source eNB 60 and an MEC server ID indicating the transmission source MEC server 40 are set to the DeadlineSuccessNotificationSetup message. Furthermore, a Direction indicating whether a flow related to a control target UE is a UL direction, a DL direction or the UL direction and the DL direction is set to the DeadlineSuccessNotificationSetup message. Furthermore, a NotificationInterval indicating a transmission interval may be set to the DeadlineSuccessNotificationSetup message.

Next, the eNB 60 transmits the DeadlineSuccessNotification message as a response message to the DeadlineSuccessNotificationSetup message to the MEC server 40 (S32). Parameters illustrated in FIG. 14 are set to the DeadlineSuccessNotification message.

For example, an MEC server ID indicating the transmission source MEC server 40 and an eNB ID indicating the transmission source eNB 60 are set to the DeadlineSuccessNotification message. Furthermore, a Direction indicating whether a flow related to a control target UE is a UL direction, a DL direction or the UL direction and the DL direction is set to the DeadlineSuccessNotification message. In addition, when an SCEF is used as a communication apparatus 10, the above MEC server ID may be an SCEF ID.

Furthermore, the number of times of discard indicating that untransmitted data has been discarded since the data cannot be transmitted by the eNB 60 by the transmission deadline is set to the DeadlineSuccessNotification message.

In this case, the eNB 60 may discard the untransmitted data by using a discard timer. Furthermore, a discard data amount indicating a data amount (or a data size) of untransmitted data which is discarded without being transmitted by the eNB 60 by the transmission deadline is set to the DeadlineSuccessNotification message. Furthermore, a CQI value related to each UE is set to the DeadlineSuccessNotification message. Furthermore, a buffer size of the eNB 60 is set to the DeadlineSuccessNotification message. The buffer size indicates a transmission buffer size for transmitting data from the UE 80 when, for example, UL is set to the Direction, and indicates a transmission buffer size for transmitting data from the eNB 60 when DL is set to the Direction.

When receiving the DeadlineSuccessNotification message, and extracting the number of times of discard and the discard data amount, the MEC server 40 may change at least one of the Weight and the Delay budget set to each flow. When, for example, the number of times of discard and the discard data amount are larger than a predetermined value, the MEC server 40 may make the change to extend a transmission deadline set to the Delay budge. Alternatively, the MEC server 40 may transmit information related to the number of times of discard and the discard data amount to the application server 70, and obtain information related to a changed transmission deadline from the application server 70. The MEC server 40 may adjust an increase degree of a priority by, for example, predicting a future number of times of discard and a future discard data amount from a tendency of the number of times of discard and the discard data amount, and adjusting the Weight/Delay Budge. Furthermore, the MEC server 40 may adjust the above discard timer based on predicted values of the future number of times of discard and the future discard data amount.

As described above, by executing processing of controlling scheduling of radio resources according to the third embodiment, the eNB 60 can obtain information such as the Weight and the Delay budget which are necessary for scheduling from the MEC server 40. Furthermore, the eNB 60 can perform scheduling so as to maximize radio resource use efficiency in a control cycle T by using the information obtained from the MEC server 40.

Fourth Embodiment

Next, selection processing of a UE which is a radio resource allocation target according to the fourth embodiment will be described. According to the fourth embodiment, a UE selecting unit 41 selects a UE related to a flow which minimizes a difference between a time to a transmission deadline and a time by which transmission of a flow is finished. In other words, the UE selecting unit 41 may select the UE related to the flow whose time to the transmission deadline after transmission of the flow is finished is assumed to be the shortest.

For example, the UE selecting unit 41 may calculate a time which is necessary until transmission of the flow is finished by using a transmission data rate and a buffer size of an eNB 60.

The transmission data rate is calculated by using a data size transmitted during a predetermined period. The data size may be paraphrased as a data amount. For example, the UE selecting unit 41 calculates the transmission data rate by using a buffer size of the eNB 60 at a time T1 and a buffer size of the eNB 60 at a time T2. In this regard, T2>T1 holds. More specifically, the UE selecting unit 41 calculates the transmission data rate by using following equation 1.

$$\text{data rate}(T2-T1) = \{\text{Buf}(T1) + (\text{flowSize} - \text{Buf}(T2))\} / (T2-T1) \quad \text{Equation 1}$$

data rate(T2–T1): A transmission data rate in a period from the time T1 to the time T2 (for example, T2 is a current time and T1 is a time before T2)

Buf(T1): A buffer size (Byte) at the time T1

Buf(T2): A buffer size (Byte) at the time T2 flowSize: A data size (Byte) which needs to be transmitted by the transmission deadline Although a data rate of UL data is calculated according to equation 1, it is possible to calculate a data rate of DL data likewise.

Furthermore, the UE selecting unit 41 may calculate a time t1 which is necessary until transmission of the flow is finished by using following equation 2.

$$t1 = \text{Buf}(T2)/\text{data rate}(T2-T1) \quad \text{Equation 2}$$

Furthermore, the UE selecting unit 41 may calculate a difference t3 between a time to the transmission deadline and a time by which transmission of the flow is finished by using following equation 3 assuming a time t2 to the transmission deadline.

$$t3 = t2 - t1 \quad \text{Equation 3}$$

The UE selecting unit 41 may calculate t3 per flow, and select a UE 80 related to a flow of the shortest t3 as a radio resource allocation target.

As described above, the UE selecting unit 41 can select a UE related to a flow whose difference between the time to the transmission deadline and a time by which transmission of the flow is finished is minimum. Consequently, the UE selecting unit 41 can select as a scheduling target the UE 80 which does not have time to spare by the transmission deadline after finishing transmission of the flow.

Fifth Embodiment

Figure 15:
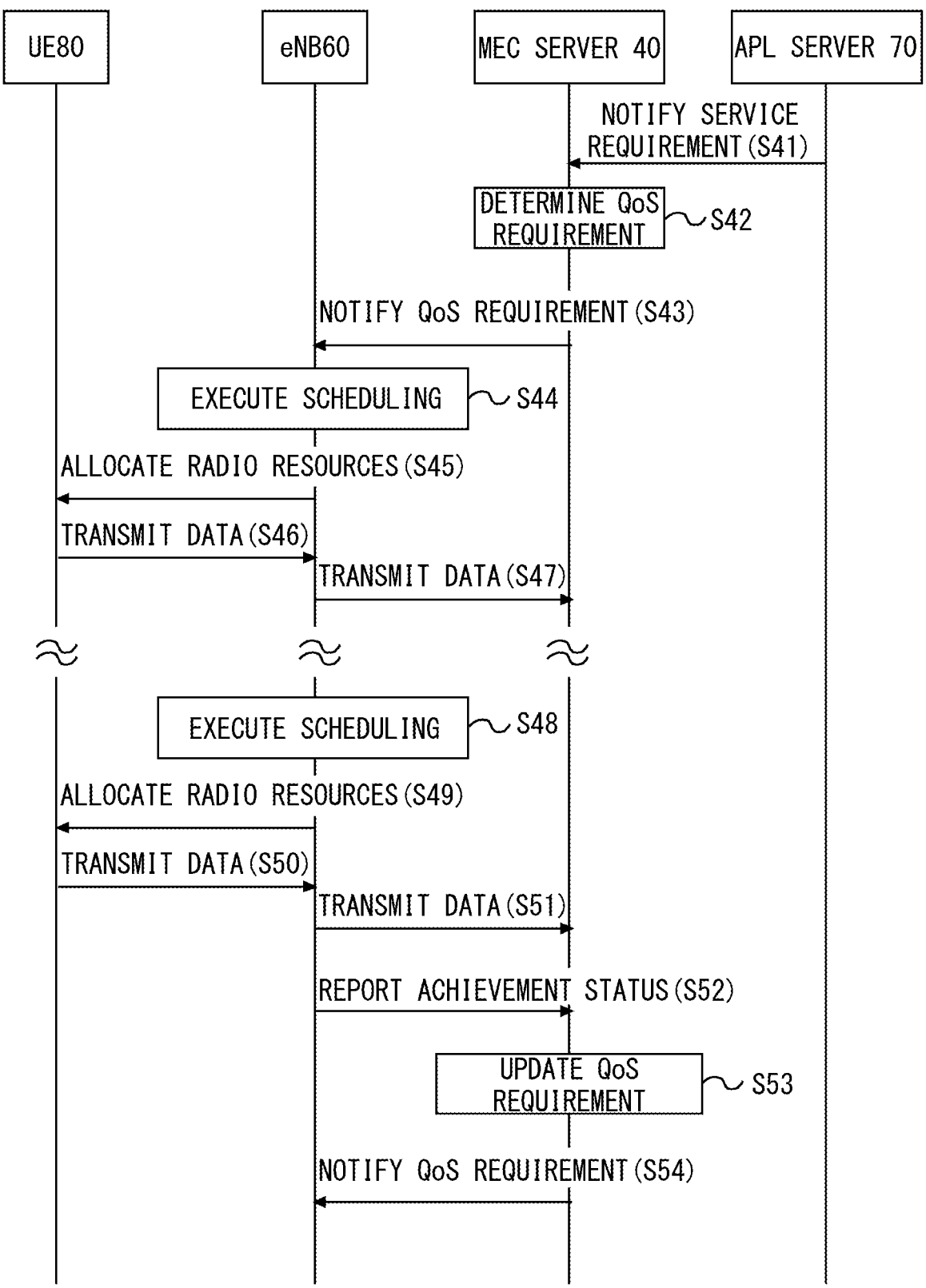
FIG. 15 is a view illustrating a flow of processing of controlling scheduling of radio resources according to a fifth embodiment.

Next, a flow of resource block allocation processing according to the fifth embodiment will be described with reference to FIG. 15. The fifth embodiment will describe resource block allocation processing in units of a plurality of communication flows. Furthermore, a data group including a plurality of communication flows will be referred to as, for example, a communication container and described.

First, an application server 70 transmits a service requirement notification message including a service requirement of each UE 80 to an MEC server 40 (S41). The service requirement includes, for example, a flow size related to the UE 80 and information related to a transmission deadline.

Next, the MEC server 40 determines a QoS (Quality of Service) requirement of the communication container by using the service requirement (S42). The QoS requirement includes, for example, a container size indicating a data size of the communication container, and information related to a transmission deadline related to the communication container. Next, the MEC server 40 transmits the QoS requirement notification message including the determined QoS requirement to the eNB 60 (S43). When the QoS requirement requests to increase the container size or shorten the transmission deadline, the eNB 60 immediately executes processing by using a new QoS requirement. When the QoS requirement requests to reduce the container size or extend the transmission deadline, the eNB 60 executes processing on a next communication container of the currently processed communication container by using the new QoS requirement.

Next, the eNB 60 calculates a Metric per UE 80 and executes radio scheduling by taking the Metric into account such that the UE 80 can finish transmitting data in units of the communication containers (S44). The Metric is a parameter indicating a flow priority.

Next, the eNB 60 transmits a radio resource allocation message to the UE 80 to notify the UE 80 of the radio resources which are allocated to the UE 80 as a result of execution of the radio scheduling in step S44 (S45).

Next, the UE 80 transmits data by using the allocated radio resources (S46). Furthermore, the eNB 60 transmits the data to the MEC server 40. Steps S48 to S51 are the same processing as those in steps S44 to S47. After step S47, the processing in steps S44 to S47 may be executed a plurality of times.

The processing in steps S44 to S47 is repeated until the transmission deadline expires or until data corresponding to a predetermined container size is transmitted to the eNB 60.

Furthermore, at a point of time at which the eNB 60 receives the data corresponding to the container size from the UE 80 before the transmission deadline expires, and when there is remaining data in an RLC buffer of the UE 80, the UE 80 starts a next transmission deadline from this point of time, and transmits data to the eNB 60.

Alternatively, when the transmission deadline expires before the eNB 60 receives the data corresponding to the container size, the eNB 60 starts the next transmission deadline at a point of time at which the transmission deadline expires, and the UE 80 transmits the data to the eNB 60.

After the eNB 60 transmits the data to the MEC server 40 in step S51, the eNB 60 transmits an achievement status report message to the MEC server 40 to notify the MEC server 40 of a QoS requirement achievement status (S52).

Next, the MEC server 40 updates the QoS requirement related to the UE 80 by taking into account the QoS requirement achievement status transmitted from the eNB 60 (S53). Next, the MEC server 40 transmits the updated QoS requirement to the eNB 60 (S54).

Although the flow of the processing in a case where the UE 80 transmits uplink data has been described with reference to FIG. 15, the eNB 60 transmits the QoS requirement achievement status to the MEC server 40 likewise in a case where the eNB 60 transmits downlink data to the UE 80, too.

As described above, even when the processing in FIG. 15 is executed and the eNB 60 cannot recognize a break between a flow and a flow, it is possible to allocate the resource blocks by taking into account the transmission deadline related to the communication container. As a result, even when a flow size fluctuates, it is possible to allocate resource blocks based on the transmission deadline.

Figure 16:
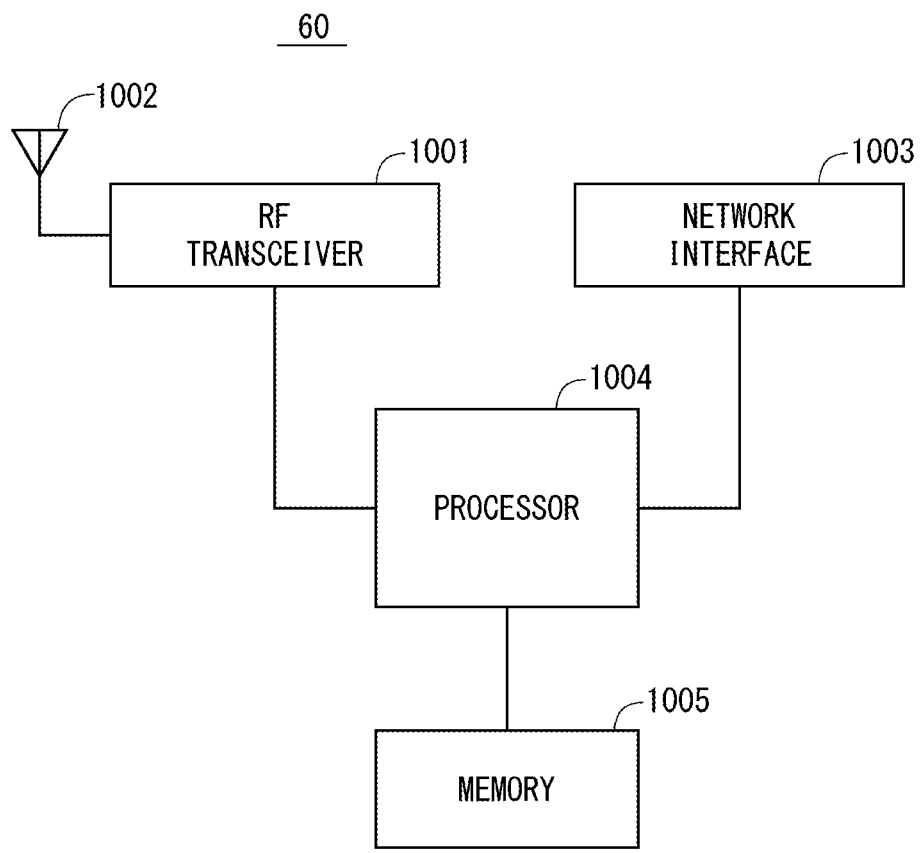
FIG. 16 is a configuration diagram of an eNB according to each embodiment.

Next, configuration examples of the eNB 60, the MEC server 40 and the UE 80 described in a plurality of the above embodiments will be described below. FIG. 16 is a block diagram illustrating the configuration example of the eNB 60. In view of FIG. 16, the eNB 60 includes an RF transceiver 1001, a network interface 1003, a processor 1004 and a memory 1005. The RF transceiver 1001 performs analog RF signal processing to communicate with UEs. The RF transceiver 1001 may include a plurality of transceivers. The RF transceivers 1001 is integrated with an antenna 1002 and the processor 1004. The RF transceiver 1001 receives modulated symbol data (or OFDM symbol data) from the processor 1004, generates a transmission RF signal and supplies the transmission RF signal to the antenna 1002. Furthermore, the RF transceiver 1001 receives a baseband received signal based on a received RF signal received by the antenna 1002, and supplies the baseband received signal to the processor 1004.

The network interface 1003 is used to communicate with a network node (e.g., another core network node). The network interface 1003 may include, for example, a network interface card (NIC) compliant with, for example, IEEE 802.3 series.

The processor 1004 performs data plane processing which includes digital baseband signal processing for wireless communication, and control plane processing. In a case of, for example, LTE and LTE-Advanced, the digital baseband signal processing of the processor 1004 may include signal processing of an MAC layer and a PHY layer.

The processor 1004 may include a plurality of processors. For example, the processor 1004 may include a modem processor (e.g., DSP) which performs the digital baseband signal processing, and a protocol stack processor (e.g., a CPU or an MPU) which performs the control plane processing.

The memory 1005 is configured by a combination of a volatile memory and a non-volatile memory. The memory 1005 includes a plurality of physically independent memory devices. The volatile memory is, for example, a Static Random Access Memory (SRAM), a Dynamic RAM (DRAM) or a combination thereof. The non-volatile memory is a mask Read Only Memory (MROM), an Electrically Erasable Programmable ROM (EEPROM), a flash memory, a hard disk drive or an optional combination thereof. The memory 1005 may include a storage disposed apart from the processor 1004. In this case, the processor 1004 may access the memory 1005 via the network interface 1003 or an unillustrated I/O interface.

The memory 1005 may store a software module (computer program) including a command group and data for performing processing of the eNB 60 described in a plurality of the above embodiments. According to some implementations, the processor 1004 may be configured to perform processing of the eNB 60 described in the above embodiments by reading the software module from the memory 1005 and executing the software module.

Figure 17:
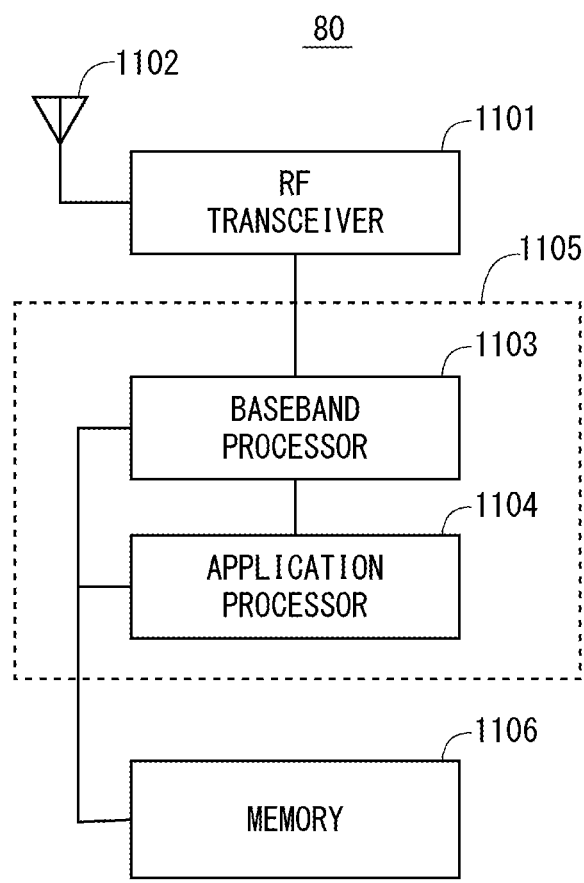
FIG. 17 is a configuration diagram of a UE according to each embodiment.

FIG. 17 is a block diagram illustrating the configuration example of the UE 80. A Radio Frequency (RF) transceiver 1101 performs analog RF signal processing for communicating with the eNB 60. The analog RF signal processing performed by the RF transceiver 1101 includes frequency upconversion, frequency downconversion and amplification. The RF transceiver 1101 is coupled with an antenna 1102 and a baseband processor 1103. That is, the RF transceiver 1101 receives modulated symbol data (or OFDM symbol data) from the baseband processor 1103, generates a transmission RF signal and supplies the transmission RF signal to the antenna 1102. Furthermore, the RF transceiver 1101 generates a baseband received signal based on a received RF signal received by the antenna 1102, and supplies the baseband received signal to the baseband processor 1103.

The baseband processor 1103 performs digital baseband signal processing (data plane processing) for wireless communication, and control plane processing. The digital baseband signal processing includes (a) data compression/restoration, (b) segmentation/concatenation of data, (c) generation/decomposition of a transmission format (transmission frame), (d) channel coding/decoding, (e) modulation (symbol mapping)/demodulation, and (f) generation of OFDM symbols (baseband OFDM signal) by Inverse Fast Fourier Transform (IFFT). On the other hand, the control plane processing includes communication management of a layer 1 (e.g., transmission power control), a layer 2 (e.g., radio resource management and hybrid automatic repeat request (HARQ) processing) and a layer 3 (e.g., attach, mobility and signaling related to communication management).

In a case of, for example, LTE and LTE-Advanced, the digital baseband signal processing of the baseband processor 1103 may include signal processing of a Packet Data Convergence Protocol (PDCP) layer, a Radio Link Control (RLC) layer, an MAC layer and a PHY layer. Furthermore, the control plane processing of the baseband processor 1103 may include processing of a Non-Access Stratum (NAS) protocol, an RRC protocol and an MAC CE.

The baseband processor 1103 may include a modem processor (e.g., Digital Signal Processor (DSP)) which performs the digital baseband signal processing, and a protocol stack processor (e.g., a Central Processing Unit (CPU) or a Micro Processing Unit (MPU)) which performs the control plane processing. In this case, the protocol stack processor which performs the control plane processing and an application processor 1104 described later may be commonalized.

The application processor 1104 is also referred to as a CPU, an MPU, a microprocessor or a processor core. The application processor 1104 may include a plurality of processors (a plurality of processor cores). The application processor 1104 realizes various functions of the UE 80 by executing a system software program (Operating System (OS)) read from a memory 1106 or an unillustrated memory, and various application programs (e.g., a call application, a WEB browser, a mailer, a camera operation application and a music playback application).

According to some implementations, as indicated by a broken line (1105) in FIG. 17, the baseband processor 1103 and the application processor 1104 may be integrated on one chip. In other words, the baseband processor 1103 and the application processor 1104 may be implemented as one System on Chip (SoC) device 1105. The SoC device is also referred to as a system Large Scale Integration (LSI) or a chip set.

The memory 1106 is a volatile memory, a non-volatile memory or a combination thereof. The memory 1106 includes a plurality of physically independent memory devices. The volatile memory is, for example, a Static Random Access Memory (SRAM), a Dynamic RAM (DRAM) or a combination thereof. The non-volatile memory is a mask Read Only Memory (MROM), an Electrically Erasable Programmable ROM (EEPROM), a flash memory, a hard disk drive or an optional combination thereof. For example, the memory 1106 may include an external memory device which the baseband processor 1103, the application processor 1104 and the SoC 1105 can access. The memory 1106 may include a built-in memory device integrated in the baseband processor 1103, in the application processor 1104 on in the SoC 1105. Furthermore, the memory 1106 may include a memory in a Universal Integrated Circuit Card (UICC).

The memory 1106 may store a software module (computer program) including a command group and data for performing processing of the UE 80 described in a plurality of the above embodiments. According to some implementations, the baseband processor 1103 or the application processor 1104 may be configured to perform processing of the UE 80 described in the above embodiments by reading the software module from the memory 1106 and executing the software module.

Figure 18:
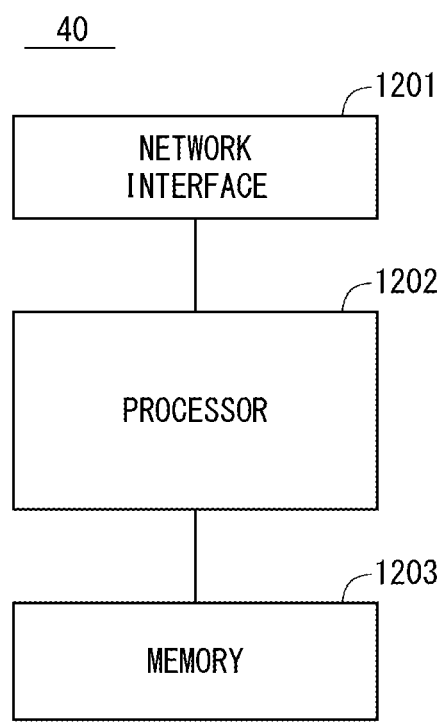
FIG. 18 is a configuration diagram of an MEC server according to each embodiment.

FIG. 18 is a block diagram illustrating the configuration example of the MEC server 40. In view of FIG. 18, the MEC server 40 includes a network interface 1201, a processor 1202 and a memory 1203. The network interface 1201 is used to communicate with a network node (a remote node 10 and the core network 40). The network interface 1201 may include, for example, a network interface card (NIC) compliant with, for example, IEEE 802.3 series.

The processor 1202 performs processing of a center node 20 described with reference to the sequence diagrams and the flowchart in the above embodiments by reading software (computer program) from the memory 1203 and executing the software. The processor 1202 may be, for example, a microprocessor, an MPU or a CPU. The processor 1202 may include a plurality of processors.

The processor 1202 performs data plane processing which includes digital baseband signal processing for wireless communication, and control plane processing. In a case of, for example, LTE and LTE-Advanced, the digital baseband signal processing of the processor 1004 may include signal processing of a PDCP layer, an RLC layer and an MAC layer. Furthermore, the signal processing of the processor 1202 may include signal processing of a GTP-U•UDP/IP layer in an X2-U interface and an S1-U interface. Furthermore, the control plane processing of the processor 1004 may include processing of an X2AP protocol, an S1-MME protocol and an RRC protocol.

The processor 1202 may include a plurality of processors. For example, the processor 1004 may include a modem processor (e.g., DSP) which performs the digital baseband signal processing, a processor (e.g. DSP) which performs the signal processing of the GTP-U•UDP/IP layer in the X2-U interface and the S1-U interface, and a protocol stack processor (e.g., a CPU or an MPU) which performs the control plane processing.

The memory 1203 is configured by a combination of a volatile memory and a non-volatile memory. The memory 1203 may include a storage disposed apart from the processor 1202. In this case, the processor 1202 may access the memory 1203 via an unillustrated I/O interface.

In the example in FIG. 18, the memory 1203 is used to store a software module group. The processor 1202 can perform processing of the MEC server 40 described in the above embodiments by reading these software module groups from the memory 1203 and executing the software module groups.

As described with reference to FIGS. 16 to 18, each processor of the eNB 60, the MEC server 40 and the UE 80 in the above embodiments executes one or a plurality of programs including the command group for causing a computer to execute the algorithm described with reference to the drawings.

Furthermore, in the above example, the program can be stored by using various types of non-transitory computer readable medium, and be supplied to a computer. The non-transitory computer readable medium includes various types of tangible storage medium. The non-transitory computer readable medium includes, for example, magnetic recording media (e.g., flexible disks, magnetic tapes and hard disk drives), magnetooptical recording media (e.g., magnetooptical disks), CD-ROMs (Read Only Memory), CD-Rs, CD-R/Ws and semiconductor memories (e.g., mask ROMs, PROMs (Programmable ROM), EPROMs (Erasable PROM), flash ROMs and RAMs (Random Access Memory)). Furthermore, the programs may be supplied to the computer via various types of transitory computer readable medium. The transitory computer readable medium includes, for example, electrical signals, optical signals and electromagnetic waves. The transitory computer readable medium can supply the programs to the computer via wired communication channels such as electrical cables or optical fibers or wireless communication channels.

In addition, the present invention is not limited to the above embodiments, and can be optionally changed without departing from the gist. Furthermore, the present invention may be carried out by optionally combining the respective embodiments.

Part or all of the above embodiments can be disclosed as in the following supplementary notes, yet are not limited to the following supplementary notes.

(Supplementary Note 1) A communication apparatus includes:

an allocating unit configured to determine a transmission size of a data packet transmitted within a control cycle including a plurality of unit times based on a time to a transmission deadline to a flow related to a wireless terminal, and determine a radio resource that is allocated to the wireless terminal and enables transmission of the data packet of the transmission size; and a communication unit configured to transmit information related to the determined radio resource to a base station configured to perform wireless communication with the wireless terminal.

(Supplementary Note 2) The communication apparatus according to Supplementary Note 1 further includes a selecting unit configured to select a wireless terminal that is an allocation target of the radio resource based on the time to the transmission deadline of the flow related to each of the wireless terminals.

(Supplementary Note 3) In the communication apparatus according to Supplementary Note 2, the allocating unit determines the radio resource allocated to the wireless terminal so as to maximize use efficiency of the radio resource included in the control cycle.

(Supplementary Note 4) In the communication apparatus according to Supplementary Note 3, the use efficiency of the radio resource is a rate of a data size of a data packet that is actually transmitted by using the radio resource with respect to a data size of a data packet that can be transmitted by using the radio resource.

(Supplementary Note 5) In the communication apparatus according to any one of Supplementary Notes 2 to 4, the allocating unit specifies the number of first radio resources having quality exceeding a predetermined threshold among a plurality of radio resources included in the control cycle, and allocates at least one of a plurality of the first radio resources to the selected wireless terminal.

(Supplementary Note 6) In the communication apparatus according to Supplementary Note 5, the allocating unit determines the number of the first radio resources allocated to the selected wireless terminal by using the transmission size of the data packet that is transmitted within the control cycle, and a transmission size that can be transmitted by using the first radio resources.

(Supplementary Note 7) In the communication apparatus according to any one of Supplementary Notes 2 to 4, the allocating unit specifies a second radio resource having the best quality among qualities of a plurality of radio resources included in the control cycle, specifies the number of third radio resources having the substantially same quality as the quality of the second radio resource, and allocates at least one of the second radio resource and the third radio resources to the selected wireless terminal.

(Supplementary Note 8) In the communication apparatus according to Supplementary Note 7, the allocating unit receives, from the base station, quality related to part of radio resources in the control cycle, and estimates quality related to other radio resources in the control cycle based on the received radio resource.

(Supplementary Note 9) The communication apparatus according to Supplementary Note 7 or 8, wherein the allocating unit calculates the numbers of the second radio resources and the third radio resources that are necessary to transmit the data packet by using the transmission size of the data packet that is transmitted within the control cycle and a transmission size that can be transmitted by using the second radio resource, and determines the numbers of the second radio resources and the third radio resources allocated to the selected wireless terminal by using the numbers of the second radio resources and the third radio resources that are necessary to transmit the data packet, and the numbers of the second radio resources and the third radio resources that are included in the control cycle.

(Supplementary Note 10) In the communication apparatus according to Supplementary Note 9, the allocating unit when the numbers of the second radio resources and the third radio resources that are necessary to transmit the data packet exceed the numbers of the second radio resources and the third radio resources that are included in the control cycle, allocates to the selected wireless terminal all of the second radio resources and the third radio resources included in the control cycle, and when the numbers of the second radio resources and the third radio resources that are necessary to transmit the data packet go below the numbers of the second radio resources and the third radio resources that are included in the control cycle, allocates to the selected radio resource the second radio resources and the third radio resources whose numbers are the same as the numbers of the second radio resources and the third radio resources that are necessary to transmit the data packet.

(Supplementary Note 11) A communication system includes:

a communication apparatus configured to transmit, to a base station, information related to a transmission deadline of a flow related to a wireless terminal; and a base station configured to determine a transmission size of a data packet transmitted within a control cycle including a plurality of unit times based on a time to the transmission deadline, and determine a radio resource that is allocated to the wireless terminal and enables transmission of the data packet of the transmission size.

(Supplementary Note 12) A communication method includes:

determining a transmission size of a data packet transmitted within a control cycle including a plurality of unit times based on a time to a transmission deadline of a flow related to a wireless terminal;

determining a radio resource that is allocated to the wireless terminal and enables transmission of the data packet of the transmission size; and transmitting information related to the determined radio resource to a base station configured to perform wireless communication with the wireless terminal.

A communication method includes:

selecting a wireless terminal that is an allocation target of a radio resource according to a time to a transmission deadline of a flow related to each of wireless terminals;

determining the radio resource allocated to the selected wireless terminal so as to maximize use efficiency of the radio resource included in a control cycle including a plurality of unit times; and transmitting information related to the determined radio resource to a base station configured to perform wireless communication with the selected wireless terminal.

(Supplementary Note 13) A program causes a computer to execute:

determining a transmission size of a data packet transmitted within a control cycle including a plurality of unit times based on a time to a transmission deadline of a flow related to a wireless terminal;

determining a radio resource that is allocated to the wireless terminal and enables transmission of the data packet of the transmission size; and transmitting information related to the determined radio resource to a base station configured to perform wireless communication with the wireless terminal.

A program causes a computer to execute:

selecting a wireless terminal that is an allocation target of a radio resource according to a time to a transmission deadline of a flow related to each of wireless terminals;

determining the radio resource allocated to the selected wireless terminal so as to maximize use efficiency of the radio resource included in a control cycle including a plurality of unit times; and transmitting information related to the determined radio resource to a base station configured to perform wireless communication with the selected wireless terminal.

REFERENCE SIGNS LIST

10 COMMUNICATION APPARATUS
11 SELECTING UNIT
12 ALLOCATING UNIT
13 COMMUNICATION UNIT
20 BASE STATION
30 WIRELESS TERMINAL
40 MEC SERVER
41 UE SELECTING UNIT
42 RESOURCE ALLOCATING UNIT
43 eNB COMMUNICATION UNIT
50 GATEWAY
60 eNB
61 CORE NETWORK NODE COMMUNICATION UNIT
62 WIRELESS ENVIRONMENT OBTAINING UNIT
63 RESOURCE ALLOCATING UNIT
64 WIRELESS UNIT
70 APPLICATION SERVER
80 UE
81 WIRELESS UNIT
82 WIRELESS ENVIRONMENT MEASUREMENT UNIT
100 CORE NETWORK

The invention claimed is:

1. A communication apparatus comprising:
at least one memory storing instructions, and
at least one processor configured to execute the instructions to:
determine a transmission size of a data packet transmitted within a control cycle including a plurality of unit times based on a time to a transmission deadline to a flow related to a wireless terminal;

determine a radio resource that is allocated to the wireless terminal and enables transmission of the data packet of the transmission size;

transmit information related to the determined radio resource to a base station configured to perform wireless communication with the wireless terminal;

select a wireless terminal that is an allocation target of the radio resource based on the time to the transmission deadline of the flow related to each of the wireless terminals;

specify a number of first radio resources having quality exceeding a predetermined threshold among a plurality of radio resources included in the control cycle, and allocate at least one of a plurality of the first radio resources to the selected wireless terminal; and determine the number of the first radio resources allocated to the selected wireless terminal by using the transmission size of the data packet that is transmitted within the control cycle, and a transmission size that can be transmitted by using the first radio resources.

2. The communication apparatus according to claim 1, wherein the at least one processor is further configured to execute the instructions to determine the radio resource allocated to the wireless terminal so as to maximize use efficiency of the radio resource included in the control cycle.

3. The communication apparatus according to claim 2, wherein the use efficiency of the radio resource is a rate of a data size of a data packet that is actually transmitted by using the radio resource with respect to a data size of a data packet that can be transmitted by using the radio resource.

4. A communication apparatus comprising:

at least one memory storing instructions, and at least one processor configured to execute the instructions to;

determine a transmission size of a data packet transmitted within a control cycle including a plurality of unit times based on a time to a transmission deadline to a flow related to a wireless terminal;

determine a radio resource that is allocated to the wireless terminal and enables transmission of the data packet of the transmission size;

transmit information related to the determined radio resource to a base station configured to perform wireless communication with the wireless terminal;

select a wireless terminal that is an allocation target of the radio resource based on the time to the transmission deadline of the flow related to each of the wireless terminals; and specify a first radio resource having the best quality among qualities of a plurality of radio resources included in the control cycle, specify a number of second radio resources having the substantially same quality as the quality of the first radio resource, and allocate at least one of the first radio resource and the second radio resources to the selected wireless terminal.

5. The communication apparatus according to claim 4, wherein the at least one processor is further configured to execute the instructions to receive, from the base station, quality related to part of radio resources in the control cycle, and estimate quality related to other radio resources in the control cycle based on the received radio resource.

6. The communication apparatus according to claim 4, wherein the at least one processor is further configured to execute the instructions to calculate the numbers of the first radio resources and the second radio resources that are necessary to transmit the data packet by using the transmission size of the data packet that is transmitted within the control cycle and a transmission size that can be transmitted by using the first radio resource, and determine the numbers of the first radio resources and the second radio resources allocated to the selected wireless terminal by using the numbers of the first radio resources and the second radio resources that are necessary to transmit the data packet, and the numbers of the first radio resources and the second radio resources that are included in the control cycle.

7. The communication apparatus according to claim 6, wherein when the numbers of the first radio resources and the second radio resources that are necessary to transmit the data packet exceed the numbers of the first radio resources and the second radio resources that are included in the control cycle, allocates to the selected wireless terminal all of the first radio resources and the second radio resources included in the control cycle, and when the numbers of the first radio resources and the second radio resources that are necessary to transmit the data packet go below the numbers of the first radio resources and the second radio resources that are included in the control cycle, the at least one processor is further configured to execute the instructions to allocate to the selected radio resource the first radio resources and the second radio resources whose numbers are the same as the numbers of the first radio resources and the second radio resources that are necessary to transmit the data packet.

8. A communication method comprising:

selecting a wireless terminal that is an allocation target of a radio resource based on a time to a transmission deadline of a flow related to each of the wireless terminals;

determining a transmission size of a data packet transmitted within a control cycle including a plurality of unit times based on the time to the transmission deadline of the flow related to the wireless terminal;

determining the radio resource that is allocated to the wireless terminal and enables transmission of the data packet of the transmission size;

transmitting information related to the determined radio resource to a base station configured to perform wireless communication with the wireless terminal specifying a number of first radio resources having quality exceeding a predetermined threshold among a plurality of radio resources included in the control cycle, and allocating at least one of a plurality of the first radio resources to the selected wireless terminal, and determining the number of the first radio resources allocated to the selected wireless terminal by using the transmission size of the data packet that is transmitted within the control cycle, and a transmission size that can be transmitted by using the first radio resources.

* * * * *